United States Patent
George et al.

(10) Patent No.: US 9,654,189 B2
(45) Date of Patent: May 16, 2017

(54) HYBRID INTRA-CELL / INTER-CELL REMOTE UNIT ANTENNA BONDING IN MULTIPLE-INPUT, MULTIPLE-OUTPUT (MIMO) DISTRIBUTED ANTENNA SYSTEMS (DASS)

(71) Applicant: Corning Optical Communications LLC, Hickory, NC (US)

(72) Inventors: Jacob George, Horseheads, NY (US); Anthony Ng'Oma, Horseheads, NY (US); Rakesh Sambaraju, Downingtown, PA (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/373,746

(22) Filed: Dec. 9, 2016

(65) Prior Publication Data

US 2017/0093468 A1   Mar. 30, 2017

Related U.S. Application Data

(63) Continuation of application No. 14/721,357, filed on May 26, 2015, now Pat. No. 9,531,452, which is a
(Continued)

(51) Int. Cl.
*H04B 7/02* (2017.01)
*H04L 1/02* (2006.01)
(Continued)

(52) U.S. Cl.
CPC ........... *H04B 7/0413* (2013.01); *H04B 7/024* (2013.01); *H04B 7/026* (2013.01); *H04L 43/16* (2013.01); *H04W 72/085* (2013.01)

(58) Field of Classification Search
CPC ...... H04B 7/024; H04B 7/026; H04B 7/0413; H04L 43/16; H04W 72/085
See application file for complete search history.

(56) References Cited

U.S. PATENT DOCUMENTS 8,599,794 B2   12/2013   Ahmadi
2008/0233967 A1   9/2008   Montojo et al.
(Continued)

FOREIGN PATENT DOCUMENTS

WO   2011158302 A1   12/2011
WO   2012148256 A1   11/2012

OTHER PUBLICATIONS

"Non-Final Rejection" mailed Jan. 4, 2016 for U.S. Appl. No. 14/721,357, p. 3-8.*
(Continued)

*Primary Examiner* — Daniel Washburn
*Assistant Examiner* — Amneet Singh
(74) *Attorney, Agent, or Firm* — C. Keith Montgomery

(57) ABSTRACT

Hybrid intra-cell/inter-cell remote unit antenna bonding in multiple-input, multiple-output (MIMO) distributed antenna systems (DASs), and related components, systems, and methods. The MIMO DASs are capable of supporting distributed MIMO communications with client devices. To provide enhanced MIMO coverage areas, hybrid intra-cell/inter-cell remote unit antenna bonding is employed. For example, if a client device has acceptable MIMO communications signal quality with MIMO antennas within a single remote unit, intra-cell bonding of the MIMO antennas can be employed to provide MIMO coverage for MIMO communications, which may avoid power imbalance issues that would result with inter-cell bonded MIMO antennas. However, if a client device has acceptable MIMO communications signal quality with MIMO antennas in a separate, neighboring remote unit(s), inter-cell bonding of the MIMO
(Continued)

antennas can be employed to provide MIMO coverage for MIMO communications.

16 Claims, 13 Drawing Sheets

Related U.S. Application Data continuation of application No. PCT/US2013/070489, filed on Nov. 18, 2013.

(60) Provisional application No. 61/731,043, filed on Nov. 29, 2012.

(51) Int. Cl.
*H04B 7/0413* (2017.01)
*H04W 72/08* (2009.01)
*H04B 7/024* (2017.01)
*H04B 7/026* (2017.01)
*H04L 12/26* (2006.01)

(56) References Cited

U.S. PATENT DOCUMENTS

| | | |
|---|---|---|
| 2010/0265874 A1 | 10/2010 | Palanki et al. |
| 2011/0009105 A1* | 1/2011 | Lee .............. H01Q 9/0407 455/418 |
| 2011/0200325 A1 | 8/2011 | Kobyakov et al. |
| 2011/0201368 A1 | 8/2011 | Faccin et al. |
| 2012/0002750 A1 | 1/2012 | Hooli et al. |
| 2012/0046039 A1 | 2/2012 | Hagerman et al. |
| 2012/0140660 A1 | 6/2012 | Kang et al. |
| 2012/0170542 A1 | 7/2012 | Zangi |
| 2012/0208581 A1 | 8/2012 | Ishida et al. |
| 2012/0243513 A1 | 9/2012 | Fujishima et al. |
| 2012/0327800 A1 | 12/2012 | Kim et al. |
| 2013/0142054 A1* | 6/2013 | Ahmadi ............ H04B 7/024 370/252 |
| 2014/0206414 A1* | 7/2014 | Oh ............ H04B 7/0404 455/562.1 |
| 2015/0023283 A1 | 1/2015 | Liu et al. |
| 2015/0270882 A1* | 9/2015 | Shattil ............ H04B 1/0003 370/329 |

OTHER PUBLICATIONS

"Final Rejection" mailed Mar. 1, 2016 for U.S. Appl. No. 14/721,357, p. 2-9.*

"Remarks" mailed Jun. 13, 2016 for U.S. Appl. No. 14/721,357, p. 9-12.*

Wei et al; "Cooperative Communication With Partial Channel-State Information in Multiuser MIMO Systems"; Int. J. Electron. Commun. (AEO) 65 (2011) 349-360.

Heath et al; "Multiuser MIMO in Distributed Antenna Systems With Out-of-Cell Interference"; IEEE Transactions on Signal Processing, vol. 59, No. 10 Oct. 2011.

Ibernon-Fernandez et al; "Comparison Between Measurements and Simulations of Conventional and Distributed MIMO Systems"; IEEE Antennas and Wireless Propagation Letters; vol. 7, 2008 p. 546-549.

Tarlassi et al; "Characterization of an Interleaved F-DAS MIMO Indoor Propagation Channel"; 2010 Loughborough Antennas & Propagation Conference; Nov. 8-9, 2010, Loughborough, UK; p. 505-508.

Vitucci et al; "Analysis of the Performance of LTE Systems in an Interleaved F-DAS MIMO Indoor Environment"; Proceedings of the 5th European Conference on Antennas and Propagation (EUCAP); p. 2184-2186.

International Search Report of the International Searching Authority; PCT/US2013/070489 Mailed Feb. 24, 2014; 4 Pages; European Patent Office.

\* cited by examiner

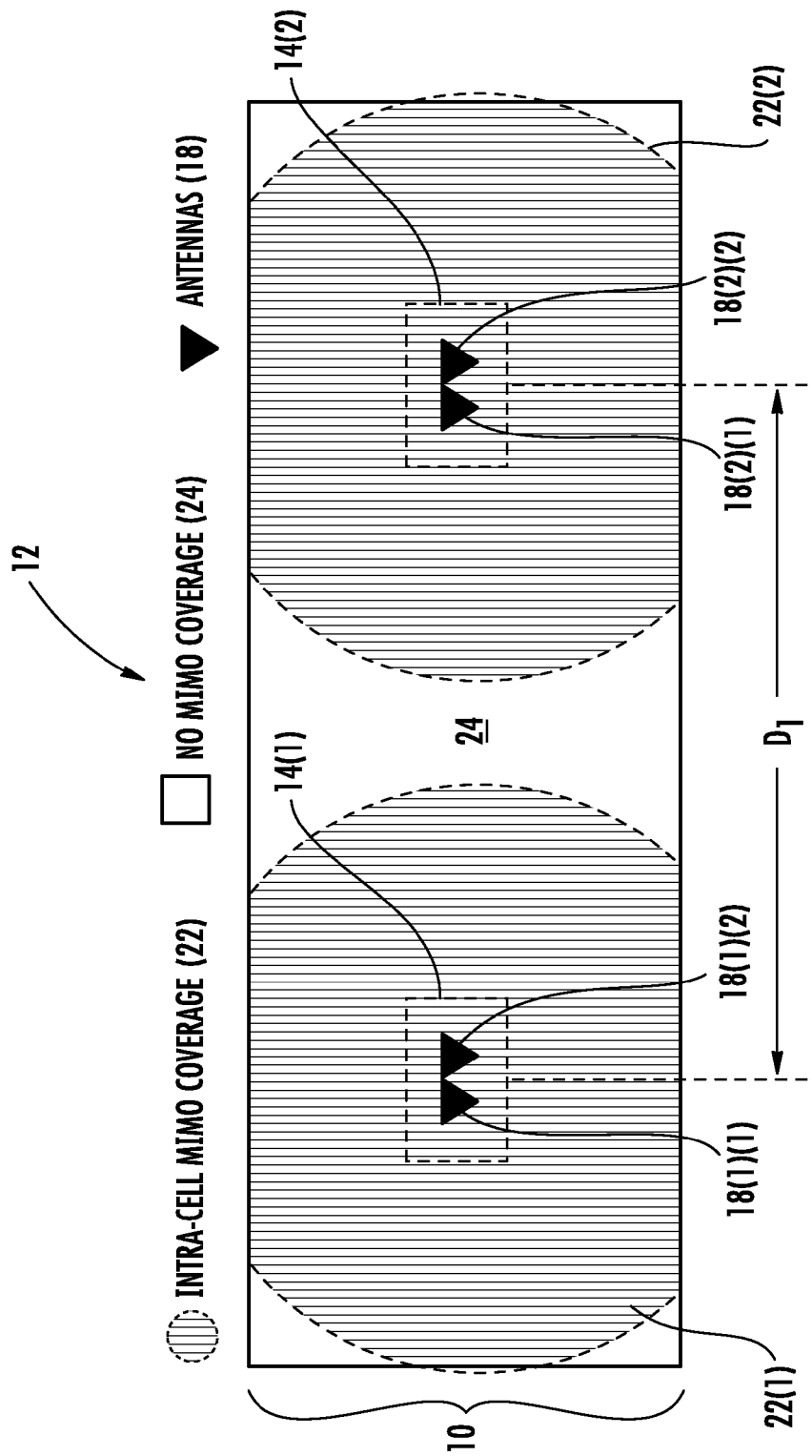

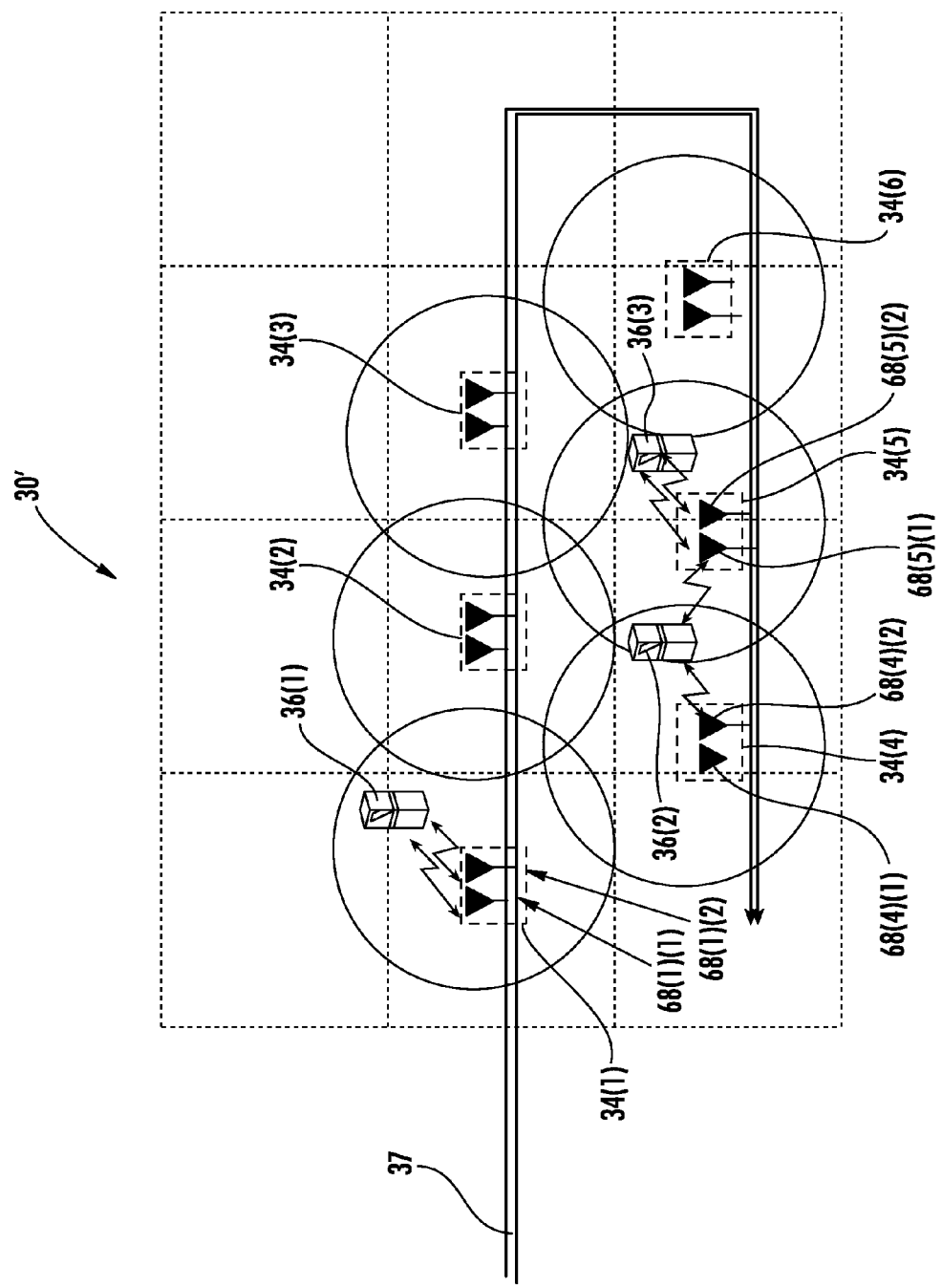

| REMOTE UNIT ID (124) | CLIENT DEVICE ID (122) | CELL BONDING MODE (126) |
|---|---|---|
| REMOTE UNIT 1 | UE 1 - 36(1)<br>UE 3 - 36(3)<br>UE 9 - 36(9) | INTRA-CELL BONDED<br>INTER-CELL BONDED<br>INTRA-CELL BONDED |
| REMOTE UNIT 2 | UE 3 - 36(3)<br>UE 2 - 36(2)<br>⋮<br>UE N - 36(N) | INTER-CELL BONDED<br>INTRA-CELL BONDED<br>⋮<br>INTER-CELL BONDED |
| ⋮ | | |
| REMOTE UNIT M | UE N - 36(N)<br>UE 4 - 36(4)<br>⋮ | INTER-CELL BONDED<br>INTRA-CELL BONDED |

FIG. 7

| REMOTE UNIT ID (134) | NEIGHBOURING REMOTE UNITS(34) (132) |
|---|---|
| REMOTE UNIT 1 | REMOTE UNIT 1, REMOTE UNIT 2, REMOTE UNIT 3, REMOTE UNIT 4 |
| REMOTE UNIT 2 | REMOTE UNIT 1, REMOTE UNIT 3, REMOTE UNIT 8, REMOTE UNIT M-1 |
| REMOTE UNIT M | REMOTE UNIT M-4, REMOTE UNIT M-3, REMOTE UNIT M-2, REMOTE UNIT M-1 |

FIG. 8

HYBRID INTRA-CELL / INTER-CELL REMOTE UNIT ANTENNA BONDING IN MULTIPLE-INPUT, MULTIPLE-OUTPUT (MIMO) DISTRIBUTED ANTENNA SYSTEMS (DASS)

PRIORITY APPLICATION

This application is a continuation of U.S. patent application Ser. No. 14/721,357, filed May 26, 2015, which is a continuation of International Application No. PCT/US13/70489, filed on Nov. 18, 2013, which claims the benefit of priority to U.S. Provisional Application No. 61/731,043, filed on Nov. 29, 2012, all of which are incorporated herein by reference in their entireties.

BACKGROUND

Field of the Disclosure

The technology of the present disclosure relates to distributed antenna systems that are capable of distributing wireless radio-frequency (RF) communications services over wired communications mediums.

Technical Background

Wireless communication is rapidly growing, with ever-increasing demands for high-speed mobile data communication. As an example, "wireless fidelity" or "WiFi" systems and wireless local area networks (WLANs) are being deployed in many different types of areas (coffee shops, airports, libraries, etc.). Wireless communication systems communicate with wireless devices called "clients," which must reside within the wireless range or "cell coverage area" in order to communicate with the access point device.

One approach to deploying a wireless communication system involves the use of "picocells." Picocells are radio frequency (RF) coverage areas having a radius in the range from about a few meters up to about twenty (20) meters. Picocells can be provided to provide a number of different services (e.g., WLAN, voice, radio frequency identification (RFID) tracking, temperature and/or light control, etc.). Because a picocell covers a small area, there are typically only a few users (clients) per picocell. Picocells also allow for selective wireless coverage in small regions that otherwise would have poor signal strength when covered by larger cells created by conventional base stations.

In conventional wireless systems, as illustrated in FIG. 1, picocell coverage areas 10 in a distributed communications system 12 are created by and centered on remote antenna units 14 connected to a head-end equipment 16 (e.g., a head-end controller or head-end unit). The remote antenna units 14 receive wireless communications services from the head-end equipment 16 over a communications medium 17 to be distributed in their coverage area 10. The remote antenna unit includes information processing electronics, an RF transmitter/receiver, and an antenna 18 operably connected to the RF transmitter/receiver to wireless distribute the wireless communication services to wireless client devices 20 within the coverage area 10. The size of a coverage area 10 is determined by the amount of RF power transmitted by the remote antenna unit 14, receiver sensitivity, antenna gain and the RF environment, as well as by the RF transmitter/receiver sensitivity of the client device 20. Client devices 20 usually have a fixed RF receiver sensitivity, so that the properties of the remote antenna unit 14 mainly determine the picocell coverage area size.

One problem that can exist with wireless communication systems, including the system 10 in FIG. 1, is the multi-path (fading) nature of signal propagation. This simply means that local maxima and minima of desired signals can exist over a picocell coverage area. A receiver antenna located at a maximum location will have better performance or signal-to-noise ratio (SNR) than a receiver antenna located in a minimum position. Signal processing techniques can be employed to improve the SNR of wireless data transmission in such wireless communication systems. For example, spatial diversity can be utilized in instances involving many access points. Other signal processing techniques include Multiple Input/Multiple Output (MIMO) techniques for increasing bit rates or beam forming for SNR, or wireless distance improvement. MIMO is the use of multiple antennas at both a transmitter and receiver to increase data throughput and link range without additional bandwidth or increased transmit power. MIMO technology can be employed in distributed antenna systems (DAS) to increase the bandwidth up to twice the nominal bandwidth.

Even with the potential doubling of bandwidth in a distributed communication system employing MIMO technology, a client device must still be within range of two MIMO antennas to realize the full benefits of increased bandwidth of MIMO technology. Ensuring uniform MIMO coverage may be particularly important for newer cellular standards, such as Long Term Evolution (LTE), where increased bandwidth requirements are expected by users of client devices in all coverage areas.

Current MIMO distributed communication systems may not provide uniform coverage areas, particularly in the edges of coverage cells. In this regard to further illustrate this problem, FIG. 2A illustrates a portion of exemplary MIMO coverage areas 10 in the distributed communications system 12 in FIG. 1. The MIMO coverage areas 10 in FIG. 2A are provided by two remote antenna units 14(1), 14(2), which are separated at a distance $D_1$ from each other. Each remote antenna unit 14(1), 14(2) has two antennas 18(1)(1), 18(1)(2) and 18(2)(1), 18(2)(2) respectively. The antenna pairs 18(1)(1), 18(1)(2) and 18(2)(1), 18(2)(2) are each capable of being configured to be intra-cell bonded together to operate in MIMO configuration. By intra-cell remote unit antenna bonding, it is meant that an antenna pair 18 in a particular remote antenna unit 14 are both involved in communications with a particular client device to provide MIMO communications. The first remote antenna unit 14(1) provides a first MIMO coverage area 22(1) using antennas 18(1)(1) and 18(1)(2). The second remote antenna unit 14(2) provides a second MIMO coverage area 22(2) using antennas 18(2)(1) and 18(2)(2). A wireless client device (not shown) located within the first MIMO coverage area 22(1) will receive MIMO services by remote antenna unit 14(1), because the client device will be in range of both antennas 18(1)(1) and 18(1)(2). Similarly, a client device located within the second MIMO coverage area 22(2) will receive MIMO services by remote antenna unit 14(2), because the client device will be in range of both antennas 18(2)(1) and 18(2)(2).

If a client device is located in a coverage area 24 outside or on the edge of the first and second MIMO coverage areas 22(1), 22(2), the client device may still be in communication range of at least one of the antennas 18 of the remote antenna units 14(1), 14(2) to receive communications services. However, the client device will not be in communication range with sufficient SNR ratio of both antenna pairs 18(1)(1), 18(1)(2) or 18(2)(1), 18(2)(2) of a remote antenna unit 14(1), 14(2), and thus will not receive MIMO communications services. FIG. 2B illustrates an exemplary graph 26 illustrating one relationship between antenna 18 separation of the remote antenna units 14(1), 14(2) and MIMO condition number (CN) in decibels (dB). For a 700 MHz communications service frequency, the allowed maximum antenna 18 separation is approximately twenty (20) meters for MIMO capacity of six (6) bits per section per Hertz (s/Hz), assuming a condition number of 60 dB illustrated as line 28. At a 2.6 GHz communications service frequency, the allowed maximum antenna 18 separation is approximately ten (10) meters for MIMO capacity of six (6) bits per section per Hertz (s/Hz), assuming a condition number of 60 dB.

An increased number of remote antenna units could be provided to reduce the maximum separations between MIMO antennas, and thus reduce or eliminate non-MIMO coverage areas. However, providing an increased number of remote antenna units in a distributed communications system increases system cost. Also, providing an increased number of remote antenna units can add additional complexity and associated cost by requiring support of a greater number of remote antenna units in the distributed communications systems.

SUMMARY OF THE DETAILED DESCRIPTION

Embodiments disclosed herein include hybrid intra-cell/inter-cell remote unit antenna bonding in multiple-input, multiple-output (MIMO) distributed antenna systems (DASs). Related components, systems, and methods are also disclosed. In certain embodiments disclosed herein, MIMO distributed antenna systems are provided that are capable of supporting distributed MIMO communications with client devices in wireless communication range of remote units. MIMO communications involve use of multiple MIMO antennas at both a transmitter and receiver to increase data throughput and link range to increase bandwidth up to twice nominal bandwidth.

To provide enhanced MIMO coverage areas in MIMO DASs, hybrid intra-cell/inter-cell remote unit antenna bonding is employed. Intra-cell remote unit antenna bonding is the involvement or bonding of MIMO antennas within a single remote unit to provide MIMO communications with a client device. Inter-cell remote unit antenna bonding is the involvement or bonding of MIMO antennas between separate, neighboring remote units to provide MIMO communications with a client device. For example, if a client device has acceptable and/or higher MIMO communications signal quality with MIMO antennas within a single remote unit, intra-cell bonding of the MIMO antennas can be employed for MIMO communications to provide MIMO coverage to avoid power imbalance issues that may result with inter-cell bonded remote unit antennas. However, as another example, if a client device has acceptable and/or higher MIMO communications signal quality with MIMO antennas with one or more neighboring remote units, inter-cell bonding of the MIMO antennas can be employed for MIMO communications to provide MIMO coverage that may not otherwise be available from intra-cell bonding. More sparse and lower cost remote unit deployments can thus provide substantially uniform high-capacity MIMO DAS coverage.

In one embodiment, a method of providing hybrid intra-cell/inter-cell remote unit antenna bonding for multiple-input, multiple-output (MIMO) communications with a client device in a MIMO DAS comprises configuring intra-cell antenna bonding for MIMO communications for a client device at a first remote unit in a MIMO DAS. The method also comprises receiving intra-cell antenna bonded MIMO communications signals from the client device at the first remote unit, and determining if the received intra-cell antenna bonded MIMO communications signals at the first remote unit exceed a threshold MIMO communications signal quality. If the received intra-cell antenna bonded MIMO communications signals at the first remote unit do not exceed the threshold MIMO communications signal quality, the method further comprises receiving MIMO communications signals from the client device from at least one neighboring remote unit to the first remote unit, and determining if the received MIMO communications signals at the at least one neighboring remote unit exceed a threshold MIMO communications signal quality. If the received MIMO communications signals at the at least one neighboring remote unit exceed the threshold MIMO communications signal quality, the method also comprises configuring inter-cell antenna bonding for MIMO communications for the client device in the at least one neighboring remote unit.

In another embodiment, a controller for providing hybrid intra-cell/inter-cell remote unit antenna bonding for multiple-input, multiple-output (MIMO) communications with a client device in a MIMO DAS is configured to configure intra-cell antenna bonding for MIMO communications for a client device at a first remote unit in a MIMO DAS. The controller is also configured to receive intra-cell antenna bonded MIMO communications signals from the client device at the first remote unit, and to determine if the received intra-cell antenna bonded MIMO communications signals at the first remote unit exceed a threshold MIMO communications signal quality. If the received intra-cell antenna bonded MIMO communications signals at the first remote unit do not exceed the threshold MIMO communications signal quality, the controller is configured to receive MIMO communications signals from the client device from at least one neighboring remote unit to the first remote unit, and determine if the received MIMO communications signals at the at least one neighboring remote unit from the client device exceed a threshold MIMO communications signal quality. If the received MIMO communications signals at the at least one neighboring remote unit exceed the threshold MIMO communications signal quality, the controller is configured to configure inter-cell antenna bonding for MIMO communications for the client device in the at least one neighboring remote unit.

In another embodiment, a computer-readable medium having instructions for causing a computer to execute a method of providing hybrid intra-cell/inter-cell remote unit antenna bonding for multiple-input, multiple-output (MIMO) communications with a client device in a MIMO DAS is provided. The instructions cause the computer to configure intra-cell antenna bonding for MIMO communications for a client device at a first remote unit in a MIMO DAS, to receive intra-cell antenna bonded MIMO communications signals from the client device at the first remote unit, and cause the computer to determine if the received intra-cell antenna bonded MIMO communications signals at the first remote unit exceed a threshold MIMO communications signal quality. If the received intra-cell antenna bonded MIMO communications signals at the first remote unit do not exceed the threshold MIMO communications signal quality, the instructions also cause the computer to receive MIMO communications signals from the client device from at least one neighboring remote unit to the first remote unit, and determine if the received MIMO communications signals at the at least one neighboring remote unit from the client device exceed a threshold MIMO communications signal quality. If the received MIMO communications signals at the at least one neighboring remote unit exceed the threshold MIMO communications signal quality, the instructions also cause the computer to configure inter-cell antenna bonding for MIMO communications for the client device in the at least one neighboring remote unit.

Additional features and advantages will be set forth in the detailed description which follows, and in part, will be readily apparent to those skilled in the art from that description or recognized by practicing the embodiments as described herein, including the detailed description that follows, the claims, as well as the appended drawings.

BRIEF DESCRIPTION OF THE FIGURES

FIG. 2A illustrates a portion of MIMO coverage areas and non-MIMO coverage areas in a distributed communications system employing MIMO technology and intra-cell remote antenna unit bonding.

FIG. 5 is a schematic diagram of hybrid intra-cell/inter-cell remote unit antenna bonding provided in an adapted MIMO DAS of FIGS. 3A and 3B.

FIG. 7 is a dynamic cell antenna bonding table used in the process in FIGS. 6A and 6B to dynamically store and identify intra-cell bonded remote unit antennas and inter-cell bonded remote unit antennas for active client device communications in the system of FIG. 5.

FIG. 8 is a remote unit mapping table used in the process in FIGS. 6A and 6B to identify and determine read MIMO communications signal qualities in neighboring remote units in the MIMO DAS of FIG. 5 for determining whether to retain a current remote unit antenna bonding mode or switch remote unit antenna bonding modes.

DETAILED DESCRIPTION

Reference will now be made in detail to the embodiments, examples of which are illustrated in the accompanying drawings, in which some, but not all embodiments are shown. Whenever possible, like reference numbers will be used to refer to like components or parts.

Embodiments disclosed herein include hybrid intra-cell/inter-cell remote unit antenna bonding that provide enhanced MIMO coverage in MIMO distributed antenna systems (DASs). In certain embodiments, MIMO DASs are capable of supporting distributed MIMO communications with client devices in wireless range of remote units. MIMO communications involve use of multiple MIMO antennas at both a transmitter and receiver to increase data throughput and link range to increase bandwidth up to twice nominal bandwidth.

Intra-cell remote unit antenna bonding is the involvement or bonding of MIMO antennas within a single remote unit to provide MIMO communications with a client device. Inter-cell remote unit antenna bonding is the involvement or bonding of MIMO antennas between separate, neighboring remote units to provide MIMO communications with a client device. For example, if a client device has acceptable and/or higher MIMO communications signal quality with MIMO antennas within a single remote unit, intra-cell antenna bonding of the MIMO antennas can be employed for MIMO communications to provide MIMO coverage to avoid power imbalance issues that may result with inter-cell bonded remote unit antennas. However, if a client device has acceptable and/or higher MIMO communications signal quality with MIMO antennas with one or more neighboring remote units, inter-cell antenna bonding of the MIMO antennas can provide MIMO coverage that may not otherwise be available through intra-cell bonding.

Figure 3A:
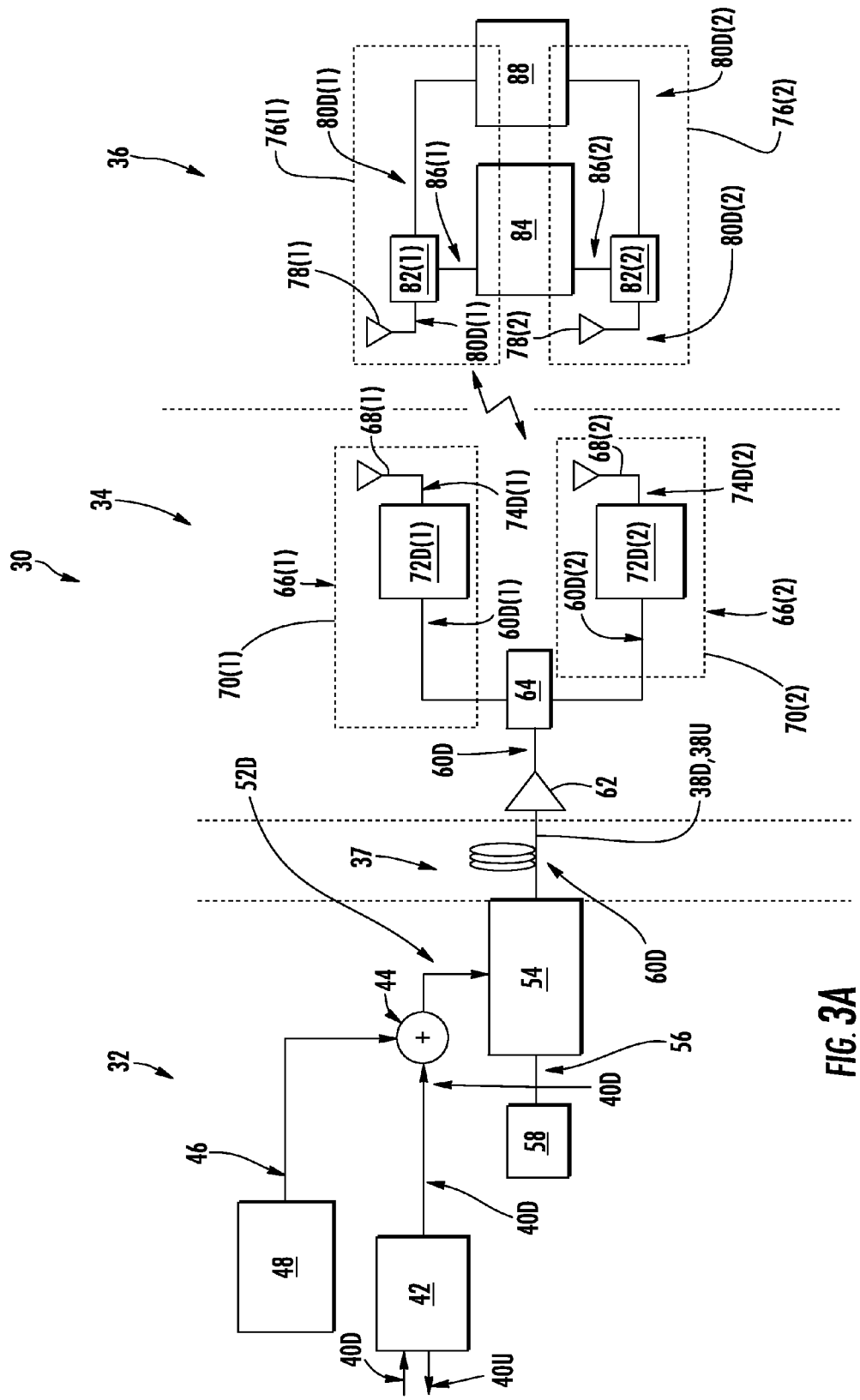
FIG. 3A is a schematic diagram of a MIMO distributed antenna system configured to support MIMO communications services with client devices.

Before discussing hybrid intra-cell/inter-cell remote unit antenna bonding starting at FIG. 5, an exemplary MIMO DAS is described in regard to FIGS. 3A-4C. FIG. 3A is a schematic diagram of an exemplary MIMO optical fiber-based distributed antenna system 30 (hereinafter referred to as "MIMO DAS 30"). The MIMO DAS 30 is configured to operate in MIMO configuration, which involves the use of multiple antennas at both a transmitter and receiver to improve communication performance. A central unit 32 is provided that is configured to distribute downlink communications signals to one or more remote units 34. FIG. 3A only illustrates one remote unit 34, but note that a plurality of remote units 34 is typically provided. The remote units 34 are configured to wirelessly communicate the downlink communications signals to one or more wireless client devices 36 (also referred to herein as "client devices 36") that are in communication range of the remote unit 34. The remote units 34 may also be referred to as "remote antenna units 34" because of their wireless transmission over antenna functionality. The remote unit 34 is also configured to receive uplink communications signals from the client devices 36 to be distributed to the central unit 32.

In this embodiment, an optical fiber communications medium 37 comprising at least one downlink optical fiber 38D and at least one uplink optical fiber 38U is provided to communicatively couple the central unit 32 to the remote units 34. The central unit 32 is also configured to receive uplink communications signals from the remote units 34 via the optical fiber communications medium 37, although more specifically over the at least one uplink optical fiber 38U. The client device 36 in communication with the remote unit 34 can provide uplink communications signals to the remote unit 34 which are then distributed over the optical fiber communications medium 37 to the central unit 32 to be provided to a network or other source, such as a base station for example.

With continuing reference to FIG. 3A, more detail will be discussed regarding the components of the central unit 32, the remote unit 34, and the client device 36 and the distribution of downlink communications signals. The central unit 32 is configured to receive electrical downlink MIMO communications signals 40D from outside the MIMO DAS 30 in a signal processor 42 and provide electrical uplink communications signals 40U, received from client devices 36, to other systems. The signal processor 42 may be configured to provide the electrical downlink communications signals 40D to a mixer 44, which may be an IQ signal mixer in this example. The mixer 44 is configured to convert the electrical downlink MIMO communications signals 40D to IQ signals. The mixer 44 is driven by a frequency signal 46 that is provided by a local oscillator 48. Frequency conversion is optional. In this embodiment, it is desired to up-convert the frequency of the electrical downlink MIMO communications signals 40D to a higher frequency to provide electrical downlink MIMO communications signals 52D to provide for a greater bandwidth capability before distributing the electrical downlink MIMO communications signals 52D to the remote units 34. For example, the up-conversion carrier frequency may be provided as an extremely high frequency (e.g., approximately 30 GHz to 300 GHz).

With continuing reference to FIG. 3A, because the communication medium between the central unit 32 and the remote unit 34 is the optical fiber communications medium 37, the electrical downlink MIMO communications signals 52D are converted to optical signals by an electro-optical converter 54. The electro-optical converter 54 includes components to receive a light wave 56 from a light source 58, such as a laser. The light wave 56 is modulated by the frequency oscillations in the electrical downlink MIMO communications signals 52D to provide optical downlink MIMO communications signals 60D over the downlink optical fiber 38D to the remote unit 34. The electro-optical converter 54 may be provided so that the electrical downlink MIMO communications signals 52D are provided as radio-over-fiber (RoF) communications signals.

Figure 3B:
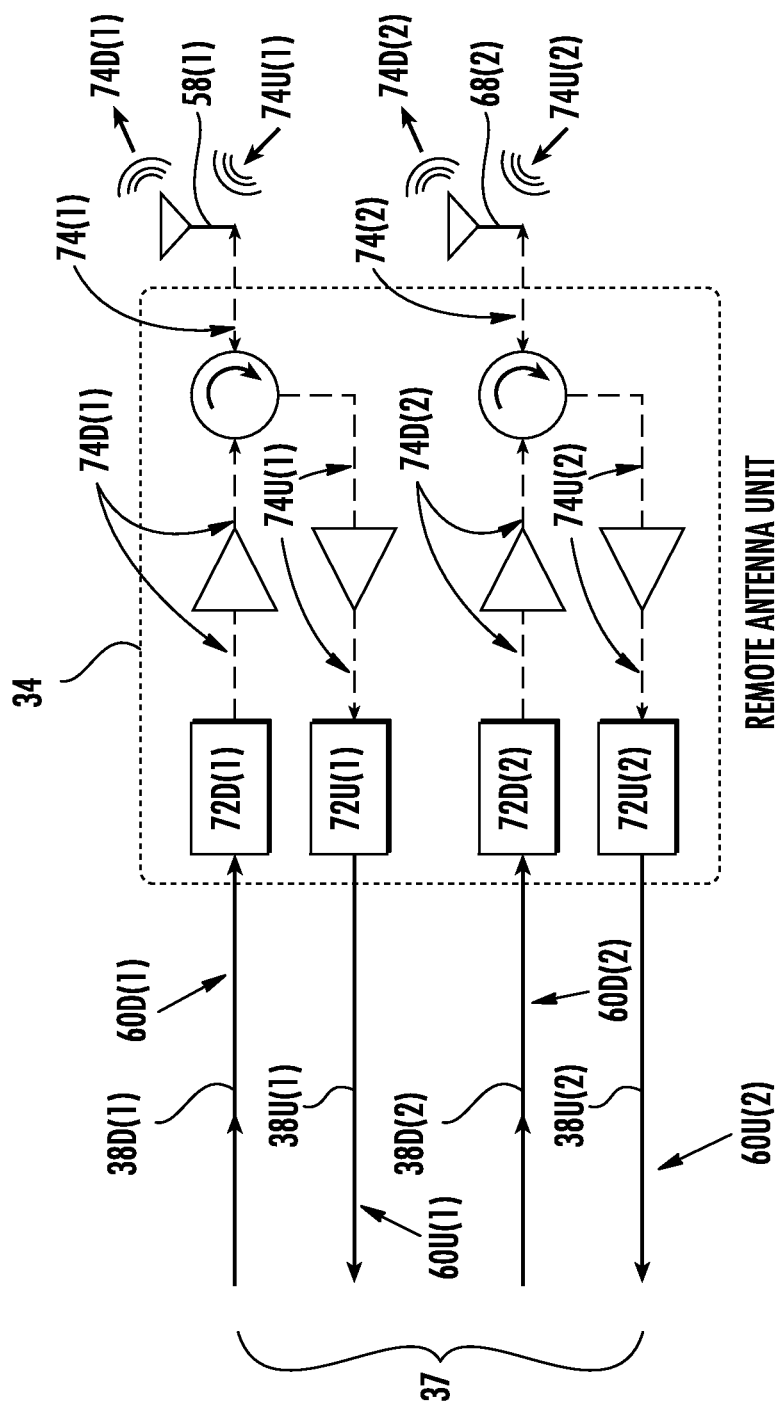
FIG. 3B is a schematic of a downlink path and uplink path and related components of the remote unit in the MIMO DAS of FIG. 3A.

With continuing reference to FIG. 3A, the optical downlink MIMO communications signals 60D are received by an optical bi-directional amplifier 62, which is then provided to a MIMO splitter 64 in the remote unit 34. The MIMO splitter 64 is provided so that the optical downlink MIMO communications signals 60D can be split among two separate downlink communication paths 66(1), 66(2) to be radiated over two separate MIMO antennas 68(1), 68(2) provided in two separate MIMO transmitters 70(1), 70(2) configured in MIMO configuration. The MIMO antennas 68(1), 68(2) are configured to be intra-cell bonded, meaning that both MIMO antennas 68(1), 68(2) within a given remote unit 34 are designed to be involved in communications with a particular client device 36 to provide MIMO communications with the particular client device 36. The MIMO splitter 64 in the remote unit 34 is an optical splitter since the received optical downlink MIMO communications signals 60D are optical signals. In each downlink communication path 66(1), 66(2), downlink optical-to-electrical converters 72D(1), 72D(2) are provided to convert the optical downlink MIMO communications signals 60D to electrical downlink MIMO communications signals 74D(1), 74D(2). The uplink path of the communications paths 66(1), 66(2) in the remote unit 34 is illustrated in FIG. 3B. As illustrated in FIG. 3B, uplink electrical-to-optical converters 72U(1), 72U(2) are also provided in the remote unit 34 to convert electrical uplink MIMO communications signals 74U(1), 74U(2) received from the client device 36 to optical uplink MIMO communications signals 60U(1), 60U(2) to be communicated over the uplink optical fiber 38U(1), 38U(2) to the central unit 32.

With reference back to FIG. 3A, the client device 36 includes two MIMO receivers 76(1), 76(2) that include MIMO receiver antennas 78(1), 78(2) also configured in MIMO configuration. The MIMO receiver antennas 78(1), 78(2) are configured to receive the electrical downlink MIMO communications signals 80D(1), 80D(2) wirelessly from the remote unit 34. Mixers 82(1), 82(2) are provided and coupled to the MIMO receiver antennas 78(1), 78(2) in the client device 36 to provide frequency conversion of the electrical downlink MIMO communications signals 80D(1), 80D(2). A local oscillator 84 is provided that is configured to provide oscillation signals 86(1), 86(2) to the mixers 82(1), 82(2), respectively, for frequency conversion. In this embodiment, the electrical downlink MIMO communications signals 80D(1), 80D(2) are down converted back to their native frequency as received by the central unit 32. The down converted electrical downlink MIMO communications signals 80D(1), 80D(2) are then provided to a signal analyzer 88 in the client device 36 for any processing desired.

Even with the potential doubling of bandwidth in the MIMO DAS 30 in FIGS. 3A and 3B, a client device 36 must still be within range of two MIMO antennas 68(1), 68(2) of a remote unit 34 to properly operate in MIMO configuration with increased bandwidth. Otherwise, the full benefits of increased bandwidth of MIMO technology provided in the MIMO DAS 30 may not be realized. Ensuring uniform MIMO coverage in coverage areas of the DAS 30 may be particularly important for newer cellular standards, such as Long Term Evolution (LTE), where increased bandwidth requirements are expected by users of client devices 36 in all coverage areas. Thus, it is desired to provide uniform coverage areas in the MIMO DAS 30, particularly in the edges of MIMO coverage cells.

Figure 2B:
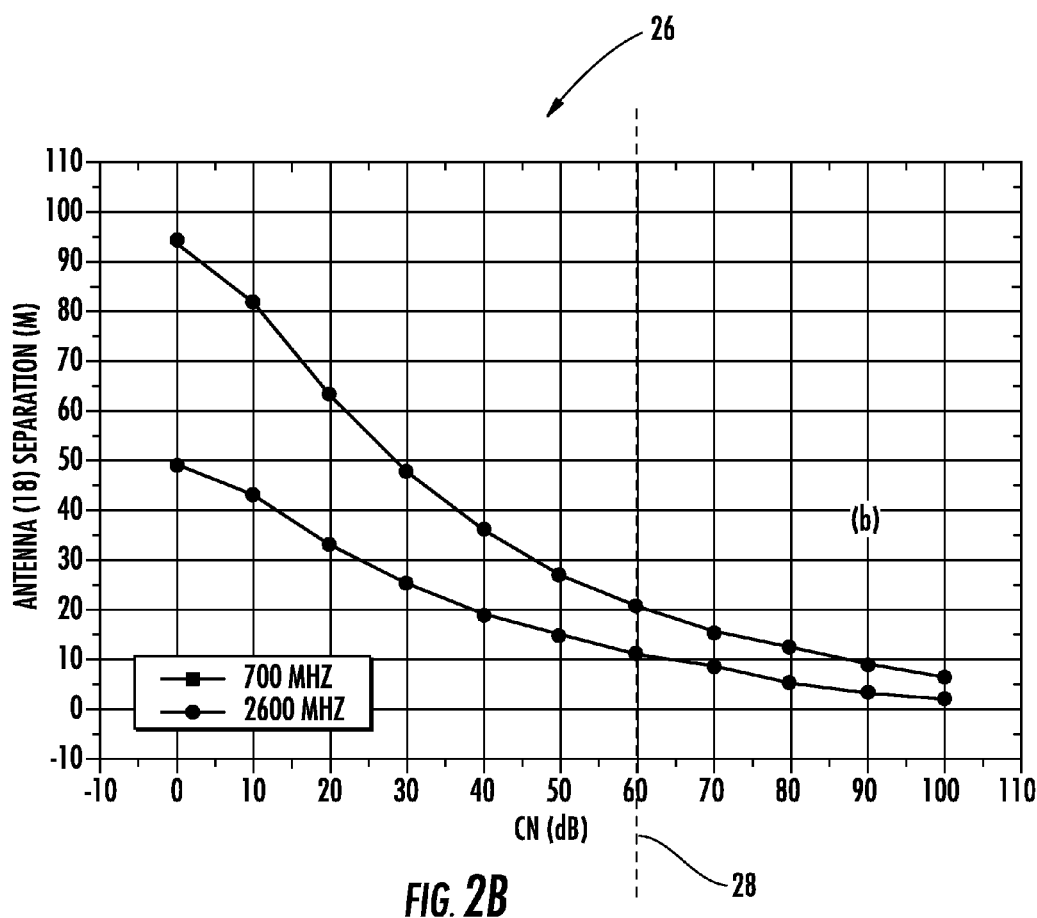
FIG. 2B is a graph illustrating one relationship between antenna separation of the remote units in FIG. 2A and MIMO condition number (CN) in decibels (dB).
Figure 4A:
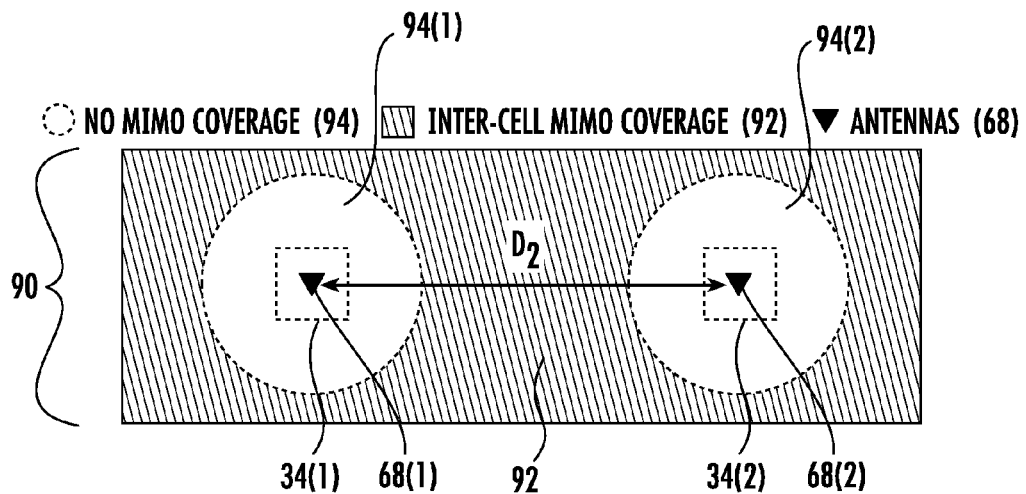
FIG. 4A illustrates a portion of MIMO coverage areas and non-MIMO coverage areas for a given distance between cell bonded antennas from adjacent remote units in the system in FIGS. 3A and 3B.

As discussed above with regard to FIGS. 2A and 2B, providing intra-cell remote unit antenna bonding in the DAS 30 in FIGS. 3A and 3B may still provide non-uniform MIMO coverage areas unless a high density of remote units 34 are provided, thereby increasing cost and complexity. FIG. 4A illustrates a portion of exemplary coverage areas 90 in the MIMO DAS 30 of FIGS. 3A and 3B when inter-cell remote unit antenna bonding is provided, as opposed to intra-cell antenna bonding. Inter-cell antenna bonding means that one MIMO antenna from one remote unit is selected to be paired with another antenna in a separate, neighboring remote unit to be involved with MIMO communication with a particular client device. In this manner, if a client device is located between the neighboring remote units such that the client device has acceptable and/or higher MIMO communications signal quality with two MIMO antennas provided in separate, neighboring remote units than a particular MIMO antenna pair in a single remote unit, the client device can enjoy the increased MIMO communication gain levels with inter-cell bonded MIMO antennas over intra-cell remote unit antenna bonding.

Referring to FIG. 4A, the coverage areas 90 are provided by two remote units 34(1), 34(2) separated at a distance $D_2$. Only one of the MIMO antennas 68(1), 68(2) for each remote unit 34(1), 34(2) is illustrated, although there are two MIMO antennas 68 provided in each remote unit 34(1), 34(2). In this embodiment, to avoid non-uniform coverage areas for client devices 36, inter-cell antenna bonding of the MIMO antennas 68(1), 68(2) from the separate, neighboring remote units 34(1), 34(2) is provided. The inter-cell antenna bonding of the MIMO antennas 68(1), 68(2) provides a MIMO coverage area 92 as illustrated in FIG. 4A. However, providing this inter-cell bonding of the MIMO antennas 68(1), 68(2) in FIG. 4A will provide non-MIMO coverage areas 94(1), 94(2) as a result of power imbalance that occurs when the client device 36 is located close to one of the MIMO antennas 68(1), 68(2), and located farther away from the other inter-cell bonded MIMO antenna 68(2), 68(1), respectively.

Figure 4B:
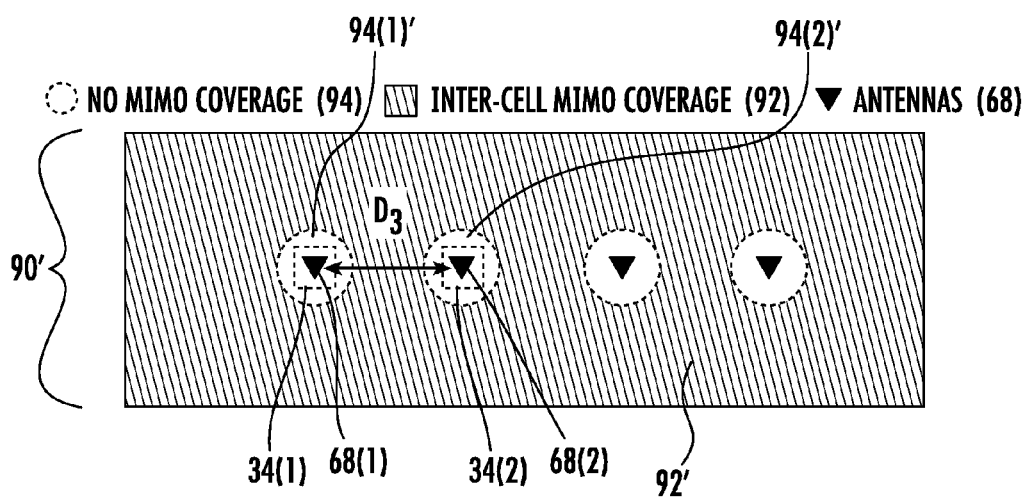
FIG. 4B illustrates a portion of MIMO coverage areas and non-MIMO coverage areas for a more dense distribution of remote units to provide a reduced distance between cell bonded antennas from neighboring remote units in the system in FIGS. 3A and 3B.

This power imbalance issue with inter-cell antenna bonding between the remote units 34(1), 34(2) in FIG. 4A can be reduced or minimized by providing the remote units 34(1), 34(2) closer to each other, as shown in FIG. 4B. As illustrated in FIG. 4B, the MIMO antennas 68(1), 68(2) of the remote units 34(1), 34(2) are separated at a distance $D_3$ from each other, which is less than $D_2$ in FIG. 4A. This configuration increases the MIMO coverage area 92' and reduces the non-MIMO coverage areas 94(1)', 94(2)', as illustrated in FIG. 4B. However, there are still non-MIMO coverage areas 94(1)', 94(2)' provided, which will reduce or not allow MIMO communications when client devices 36 are located in these non-MIMO coverage areas 94(1)', 94(2)'. The remote unit 34(1), 34(2) configuration in FIG. 4B is also more expensive, because a greater number of remote units 34 are required to provide communications coverage in the DAS 30 for a given desired coverage area.

Figure 4C:
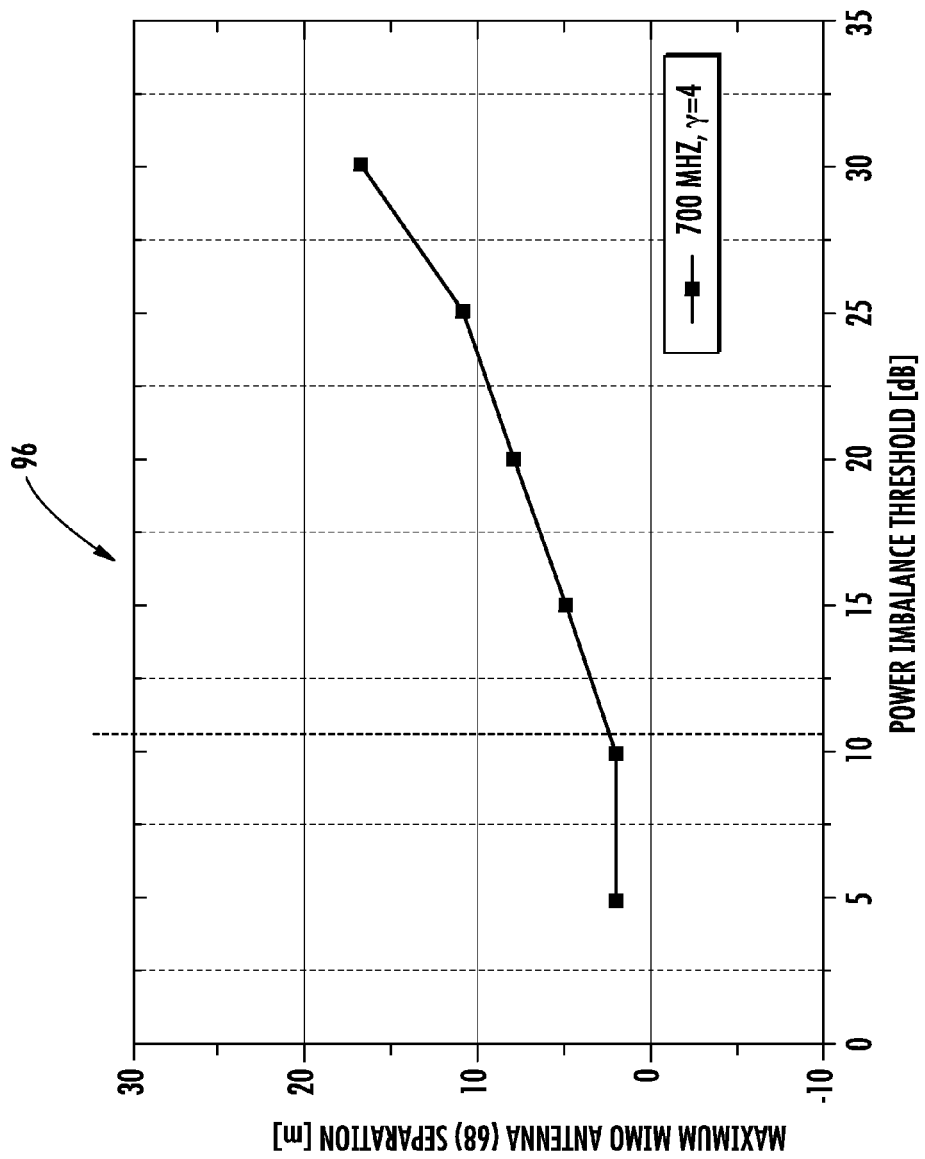
FIG. 4C is a graph illustrating an exemplary relationship between antenna separation of inter-cell bonded remote unit antennas in the system of FIGS. 3A and 3B and power imbalance threshold in decibels (dB).

FIG. 4C further illustrates the power imbalance issues as a result of inter-cell bonded remote units 34. FIG. 4C is an exemplary graph 96 illustrating an exemplary relationship between maximum antenna separation of inter-cell bonded remote units 34 in the MIMO DAS 30 of FIGS. 3A and 3B and power imbalance threshold in decibels (dB) at a 700 MHz communications frequency. As illustrated in FIG. 4C, for a maximum power imbalance of 12 dB, the maximum MIMO antenna 68 separation cannot exceed 3 meters (m) for inter-cell antenna bonding, which is an extremely dense arrangement of remote units 34.

Hybrid intra-cell/inter-cell remote unit antenna bonding in MIMO DASs enhance MIMO coverage areas in MIMO distributed antenna systems. If a client device has acceptable and/or higher MIMO communications signal quality with MIMO antennas within a single remote unit, intra-cell bonding of the MIMO antennas can be employed for MIMO communications to provide MIMO coverage to avoid power imbalance issues that may result with intra-cell bonded remote units. MIMO communications signal quality are a function of distance between a client device and MIMO antennas and quality degrades with distance due to degraded signal strength with distance. However, if a client device has acceptable and/or higher MIMO communications signal quality to MIMO antennas between at least one separate, neighboring remote unit, inter-cell bonding of the MIMO antennas can provide MIMO coverage that may not otherwise be available through intra-cell bonding.

FIG. 5 is a schematic diagram of exemplary hybrid intra-cell/inter-cell remote unit antenna bonding provided in a MIMO DAS 30' that is adapted from the MIMO DAS 30 in FIGS. 3A and 3B. Common components between the MIMO DAS 30 and 30' include common numbering in FIG. 5, and will not be re-described in detail.

As illustrated in FIG. 5, a plurality of remote units 34(1)-34(6) are provided in the MIMO DAS 30'. Client devices 36(1)-36(3) are located in the MIMO DAS 30' and are configured to receive and transmit wireless MIMO communications signals with the DAS 30' via the remote units 34(1)-34(6). The client device 36(1) is located closer to both MIMO antennas 68(1) in the remote unit 34(1) than any MIMO antennas 68 in any separate, neighboring remote unit 34(2) or 34(4). Thus, intra-cell remote unit antenna bonding is provided for the MIMO antennas 68(1)(1), 68(1)(2) of remote unit 34(1) for MIMO communications with the client device 36(1). In other words, MIMO antennas 68(1)(1), 68(1)(2) within the single remote unit 34(1) are configured to provide MIMO communications for the client device 36(1) as opposed to another MIMO antenna 68 from another neighboring remote unit 34 being configured to provide the MIMO communications for client device 34(1). Similarly, intra-cell remote unit antenna bonding is provided for the MIMO antennas 68(5)(1), 68(5)(2) of remote unit 34(5) for MIMO communications with the client device 36(3).

With continuing reference to FIG. 5, inter-cell remote unit antenna bonding is provided for MIMO communications for client device 36(2). Because the client device 36(2) has acceptable and/or higher MIMO communications signal quality (e.g., that exceeds a MIMO communications signal quality threshold) with MIMO antennas 68(4)(2) and 68(5)(1) than MIMO antenna pairs 68(4)(1), 68(4)(2) or 68(5)(1), 68(5)(2), the DAS 30' is configured to inter-cell bond MIMO antennas 68(4)(2) and 68(5)(1) for MIMO communications with client device 36(2).

Figures 6A, 6B:
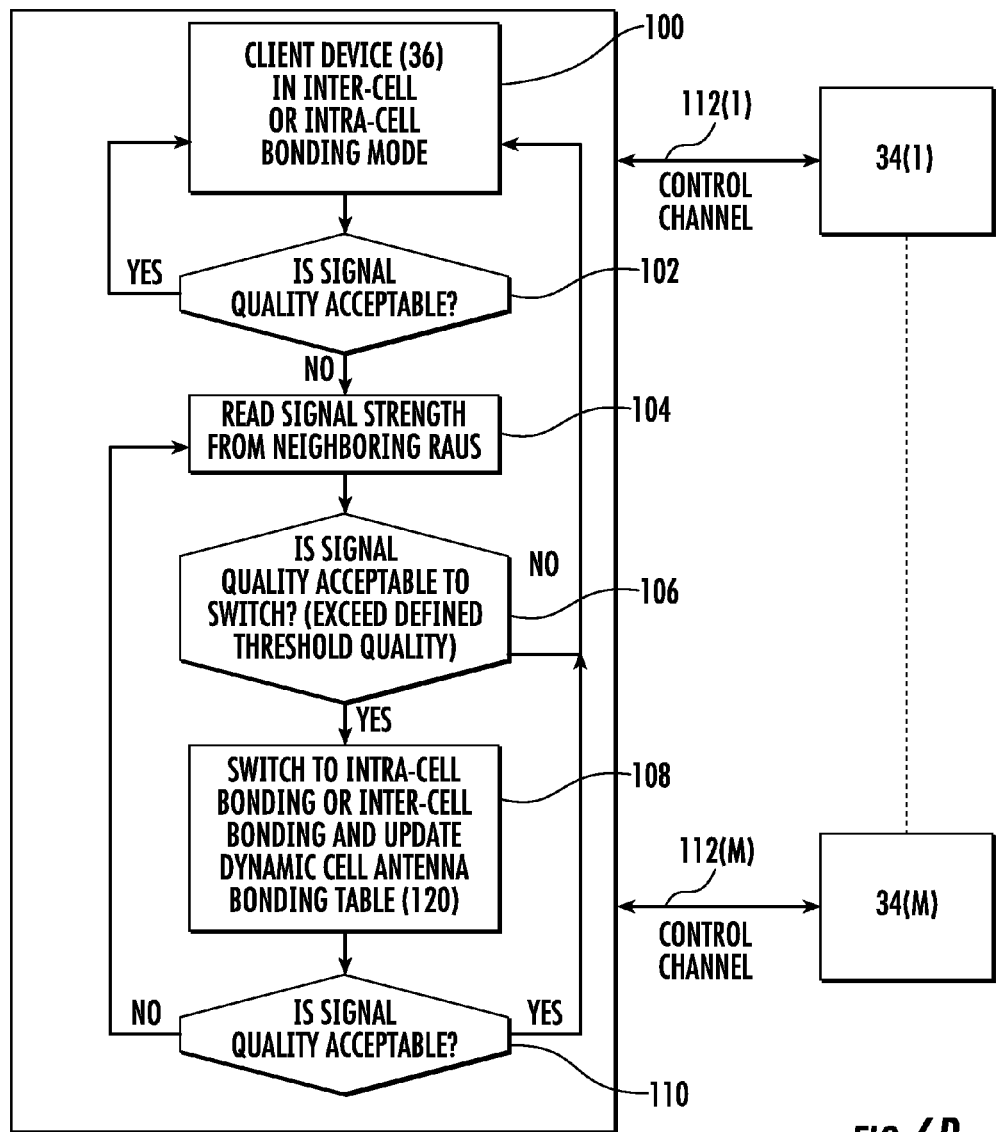
FIG. 6A is a flowchart illustrating a process for hybrid intra-cell/inter-cell remote unit antenna bonding for client devices in the system of FIG. 5.
FIG. 6B is a schematic diagram illustrating interfaces for the process in FIG. 6A for providing intra-cell and inter-cell remote unit antenna bonding for MIMO communications in the system of FIG. 5.

FIG. 6A is a flowchart illustrating an exemplary process for hybrid intra-cell/inter-cell remote unit antenna bonding for client devices 36 in the MIMO DAS 30' of FIG. 5. FIG. 6B is a schematic diagram illustrating exemplary interfaces for the process in FIG. 6A for providing intra-cell and intra-cell antenna bonding of remote units 34 for MIMO communications with client devices 36 in the MIMO DAS 30' of FIG. 5. As will be discussed in more detail below, this process determines whether MIMO communication requested by client devices 36 in the MIMO DAS 30' should be provided using intra-cell or inter-cell remote unit antenna bonding and with which remote unit 34 or remote units 34. MIMO coverage can be provided to provide acceptable MIMO communications signal quality, if possible, based on both intra-cell and inter-cell antenna bonding without having to compromise between only providing one or the other type of antenna bonding for MIMO coverage. The process is capable of dynamically adjusting whether intra-cell or inter-cell remote unit antenna bonding is employed for MIMO communications with a client device 36 based on the MIMO communications signal qualities of received MIMO communications signals by MIMO antennas 68 in the remote units 34 in the MIMO DAS 30'. It is contemplated that the exemplary hybrid intra-cell/inter-cell remote unit antenna bonding process will be carried out by the central unit 32 provided in the MIMO DAS 30' in FIG. 5. However, the exemplary hybrid intra-cell/inter-cell remote unit antenna bonding could also be carried out in other components of the DAS 30'.

The process illustrated in FIGS. 6A and 6B is described with respect to one client device 36 and the central unit 32 performing the process. However, it should be noted that the process therein can be performed by other devices other than the central unit 32 and for all client devices 36 communication with remote units 34 in the DAS 30'. The process involves a client device 36 communicating with MIMO antennas 68 of one or more remote units 34 that are either intra-cell bonded or inter-cell bonded (block 100). For example, a new MIMO communication session with a client device 36 may default to intra-cell antenna bonding with one remote unit 34 as a non-limiting example. The identification of MIMO antennas 68 assigned or associated with MIMO communications with particular client devices 36 can be stored in a dynamic cell antenna bonding table 120, as illustrated in FIG. 7. The central unit 32 can consult the dynamic cell antenna bonding table 120 to determine a cell bonding mode for remote units 34 and client devices 36, as well as storing updated cell bonding modes when switched for remote units 34 and client devices 36 according to the process in FIGS. 6A and 6B. For example, the cell bonding mode and the identification of remote units 34 bonded to a client device 36 are used to determine which MIMO antennas 68 are associated with MIMO communications with a particular client device 36 so that the correct MIMO communications signals can be associated with communications with a particular client device 36, such as by the central unit 32 or a network coupled to the central unit 32.

With reference to FIG. 7, the dynamic cell antenna bonding table 120 stores a client device identification 122 identifying client devices 36 associated or bonded in MIMO communications with one or more remote units identifications 124 identifying remote unit 34. For example, as illustrated in FIG. 7, client device 1 36(1) is only associated with remote unit 1 34(1); thus client device 1 36(1) is intra-cell antenna bonded with remote unit 1 34(1) as noted by the notation in the cell bonding mode 126 associated with client device 1 36(1). However, client device 3 36(3) is inter-cell antenna bonded with remote unit 1 34(1) and remote unit 2 34(2), as noted by the notation in the cell bonding mode 126 associated with client device 3 36(3). Client device 3 36(3) is associated with remote units 1 34(1) and remote unit 34(2) in the dynamic cell antenna bonding table 120, as illustrated in FIG. 7.

With reference back to FIGS. 6A and 6B, the MIMO communications signal quality between the bonded MIMO antennas 68 and the client device 36 are measured and analyzed to determine if the MIMO communications signals have acceptable signal quality (block 102). This step is performed to determine if the current cell-bonding mode of a client device 36 is sufficient to provide MIMO communications, examples of which have been previously described. Signal strength may be used to determine the MIMO communications signal quality is of acceptable quality, as a non-limiting example. Further, this step may involve determining if the MIMO communications signal strength exceeds a predefined MIMO communications signal quality threshold. Other measuring and analysis techniques other than signal strength may also be employed to determine MIMO communications signal quality. The central unit 32 in this embodiment is configured to receive signal quality information from the remote units 34(1)-34(M) via control channels 112(1)-112(M), as illustrated in FIG. 6B. If MIMO communications signal quality is acceptable or higher than current signal quality with a current cell bonding mode, the process repeats backs to block 100 by the client device 36 continuing to perform MIMO communications in its current cell bonding mode with the associated remote units 34 as indicated in the dynamic cell antenna bonding table 120 (in FIG. 7) as long as communications signal quality with the current cell bonding configuration is acceptable (block 102).

This step may involve determining if the MIMO communications signal strength exceeds a predefined MIMO communications signal quality threshold. An example where communications signal quality with the current cell bonding configuration may no longer be acceptable is when the client device 34 moves from its current location to another location in the MIMO DAS 30' in closer proximity to another remote unit(s) 34.

With continuing reference to FIGS. 6A and 6B, if the communications signal quality with the client device 36 is not of acceptable quality with the current cell bonding mode and antenna bonding configuration for the client device 36 (block 102), the process involves determining of the cell bonding mode and antenna bonding configuration can be switched to maintain acceptable MIMO communications. The communications signal strengths are read from neighboring remote units 34 to the remote unit 34 current associated and bonded to the client device 36 (block 104). The dynamic cell-bonding table 120 in FIG. 7 can be consulted to determine which remote units 34 are bonded to the client device 36. A remote unit\mapping table 130 in FIG. 8 can be employed to determine which remote units 34 are neighboring to the remote unit(s) 34 bonded to the client device 36. The remote unit mapping table 130 in FIG. 8 stores a list of neighboring remote units 34 (132) with each remote unit 34 identified by a remote unit identification 134 in the remote unit static table 130. The remote unit mapping table 130 in FIG. 8 may be contain remote unit mappings if the remote unit mapping table 130 is configured at setup or initialization of the MIMO DAS 30' depending on the configuration and layout of the remote units 34.

With continuing reference to FIGS. 6A and 6B, after the neighboring remote units 34 are identified, the signal quality of MIMO communications signals between the neighboring remote units 34 and the client device 36 are measured and analyzed to determine if of acceptable signal quality (block 106). For example, this step may involve determining if the MIMO communications signal strength between the neighboring remote units 34 and the client device 36 exceeds a predefined MIMO communications signal quality threshold. If the signal quality of communications signals between the neighboring remote units 34 and the client device 36 are determined to be of acceptable signal quality (block 106), the central unit 32 switches the cell bonding mode for the client device 36 by updating the dynamic cell antenna bonding table 120 in FIG. 7 with the new remote unit(s) 34 assigned to be associated or bonded with the client device 36 for MIMO communications (block 108). The client device 36 continues to communicate in the new cell-bonding mode and communications signal quality acceptability is checked (block 110). If not acceptable, the process goes to block 104 described above, in which the cell bonding mode may be switched for the client device 36 and/or different remote units 34 associated or bonded with the client device 36 employing either intra-cell antenna bonding or inter-cell antenna bonding depending on MIMO communications signal quality acceptability.

Figure 9:
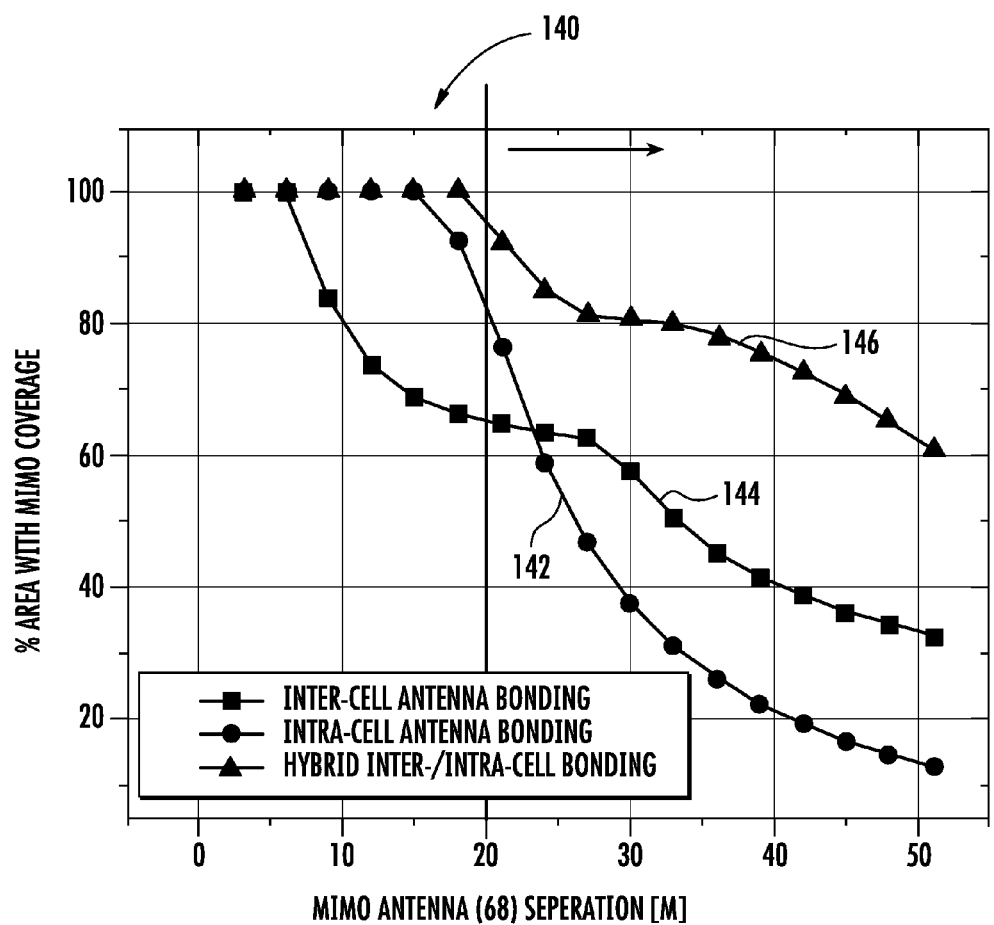
FIG. 9 is a graph of MIMO communications service performance in terms of percentage area of MIMO coverage for antenna separations for intra-cell bonded remote unit antennas, inter-cell bonded remote unit antennas, and hybrid intra-cell/inter-cell bonded remote unit antennas in the MIMO system of FIG. 5.

FIG. 9 illustrates exemplary MIMO communications performance of hybrid intra-cell/inter-cell remote unit antenna bonding. FIG. 9 is an exemplary graph 140 illustrating exemplary MIMO communications service performance in terms of percentage area of MIMO coverage for MIMO antenna 68 separations for three scenarios: (1) only intra-cell remote unit antenna bonding; (2) only inter-cell remote unit antenna bonding; and (3) hybrid intra-cell/inter-cell remote unit antenna bonding in the MIMO DAS 30' of FIG. 5. MIMO coverage curve 142 illustrates an exemplary percentage area of MIMO coverage for a given MIMO antenna 68 separation distance in the DAS 30' in FIG. 5 when only intra-cell antenna bonding is employed. MIMO coverage curve 144 illustrates an exemplary percentage area of MIMO coverage for a given MIMO antenna 68 separation distance in the DAS 30' in FIG. 5 when only inter-cell antenna bonding is employed. MIMO coverage curve 146 illustrates an exemplary percentage area of MIMO coverage for a given MIMO antenna 68 separation distance in the DAS 30' in FIG. 5 when hybrid intra-cell/inter-cell antenna bonding is employed, including as provided in the embodiments described herein.

With continuing reference to FIG. 9, for inter-cell antenna bonding, a MIMO power imbalance threshold of 12 dB and condition number of 20 dB is assumed. For intra-cell antenna bonding, a typical MIMO condition number of 60 dB is assumed. FIG. 9 shows that for extremely dense deployments (e.g., <10 m), intra-cell antenna bonding alone and inter-cell antenna bonding alone could provide sufficient MIMO coverage. However, when remote unit deployments with greater separation (e.g., >20 m) are considered, the proposed hybrid intra-cell/inter-cell antenna bonding according to the present embodiments may provide greater than 20% higher MIMO coverage than through only intra-cell antenna bonding or only inter-cell antenna bonding.

Figure 1:
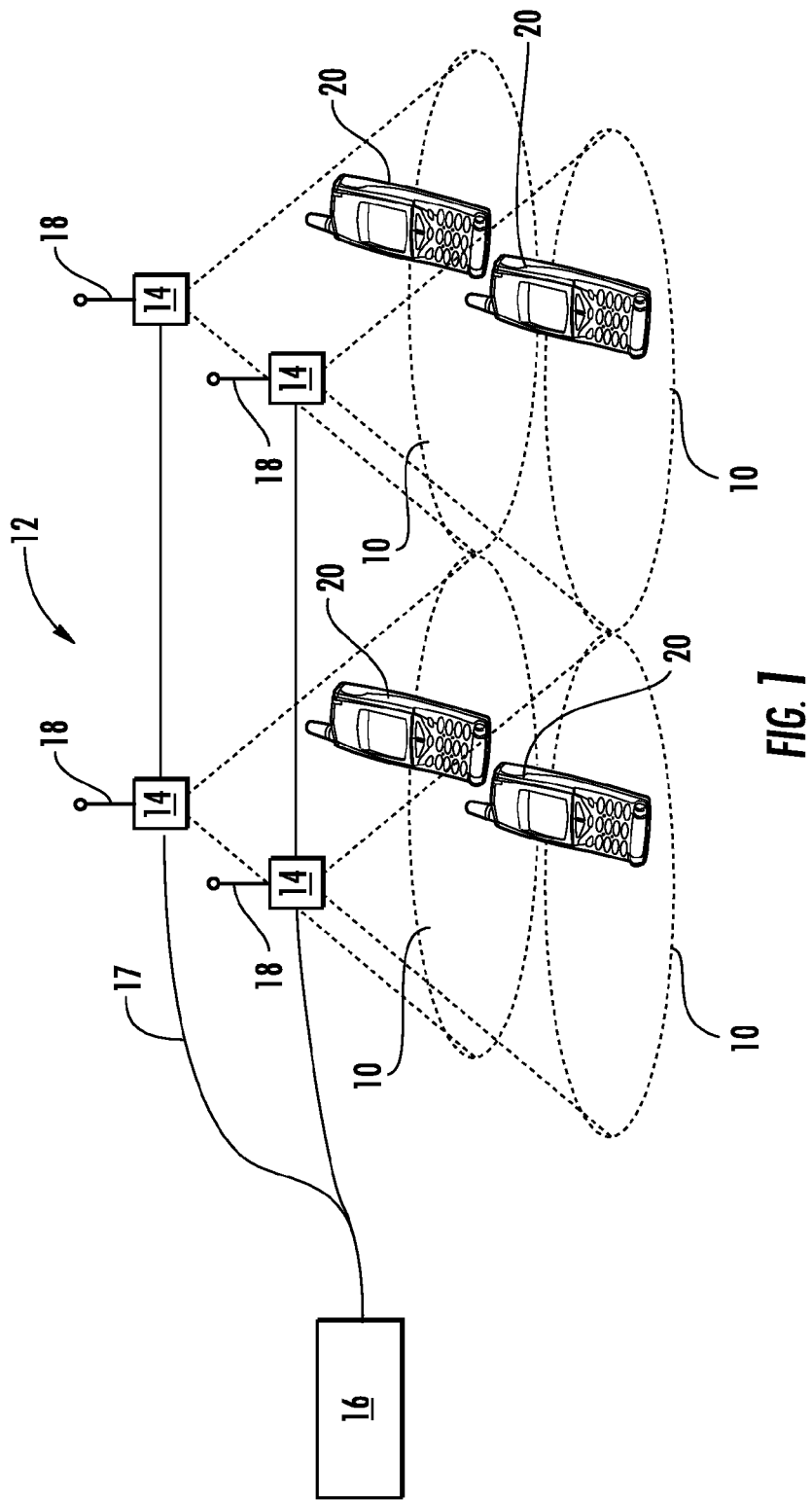
FIG. 1 is a schematic diagram of a distributed communications system capable of distributing wireless communications services to client devices.

Note that although the MIMO distributed antenna systems described above allow for distribution of radio frequency (RF) communications signals, the MIMO distributed antenna systems described above are not limited to distribution of RF communications signals. Data communications signals, including digital data signals, for distributing data services could also be distributed in the MIMO DAS in lieu of, or in addition to, RF communications signals. Also note that while the MIMO DASs in FIG. 1 described above include distribution of communications signals over optical fiber, these MIMO DASs are not limited to distribution of communications signals over optical fiber. Distribution media could also include, coaxial cables, twisted-pair conductors, wireless transmission and reception, and combinations thereof. Also, any combination can be employed that also involves optical fiber for portions of the DAS.

It may also be desired to provide high-speed wireless digital data service connectivity with remote units in the MIMO DASs disclosed herein. One example would be WiFi. WiFi was initially limited in data rate transfer to 12.24 Mb/s and is now provided at data transfer rates of up to 54 Mb/s using WLAN frequencies of 2.4 GHz and 5.8 GHz. While interesting for many applications, WiFi has proven to have too small a bandwidth to support real time downloading of uncompressed high definition (HD) television signals to wireless client devices. To increase data transfer rates, the frequency of wireless signals could be increased to provide larger channel bandwidth. For example, an extremely high frequency in the range of 30 GHz to 300 GHz could be employed. For example, the sixty (60) GHz spectrum is an EHF that is an unlicensed spectrum by the Federal Communications Commission (FCC) and that could be employed to provide for larger channel bandwidths. However, high frequency wireless signals are more easily attenuated or blocked from traveling through walls or other building structures where DASs are installed.

Thus, the embodiments disclosed herein can include distribution of extremely high frequency (EHF) (i.e., approximately 30-approximately 300 GHz), as a non-limiting example. The MIMO DASs disclosed herein can also support provision of digital data services to wireless clients. The use of the EHF band allows for the use of channels having a higher bandwidth, which in turn allows more data intensive signals, such as uncompressed HD video to be communicated without substantial degradation to the quality of the video. As a non-limiting example, the DASs disclosed herein may operate at approximately sixty (60) GHz with approximately seven (7) GHz bandwidth channels to provide greater bandwidth to digital data services. The DASs disclosed herein may be well suited to be deployed in an indoor building or other facility for delivering digital data services.

It may be desirable to provide MIMO DASs, according to the embodiments disclosed herein, that provide digital data services for client devices. For example, it may be desirable to provide digital data services to client devices located within a DAS. Wired and wireless devices may be located in the building infrastructures that are configured to access digital data services. Examples of digital data services include, but are not limited to, Ethernet, WLAN, WiMax, WiFi, DSL, and LTE, etc. Ethernet standards could be supported, including 100 Mb/s (i.e., fast Ethernet) or Gigabit (Gb) Ethernet, or ten Gigabit (10 G) Ethernet. Examples of digital data services include, wired and wireless servers, wireless access points (WAPs), gateways, desktop computers, hubs, switches, remote radio heads (RRHs), baseband units (BBUs), and femtocells. A separate digital data services network can be provided to provide digital data services to digital data client devices.

Figure 10:
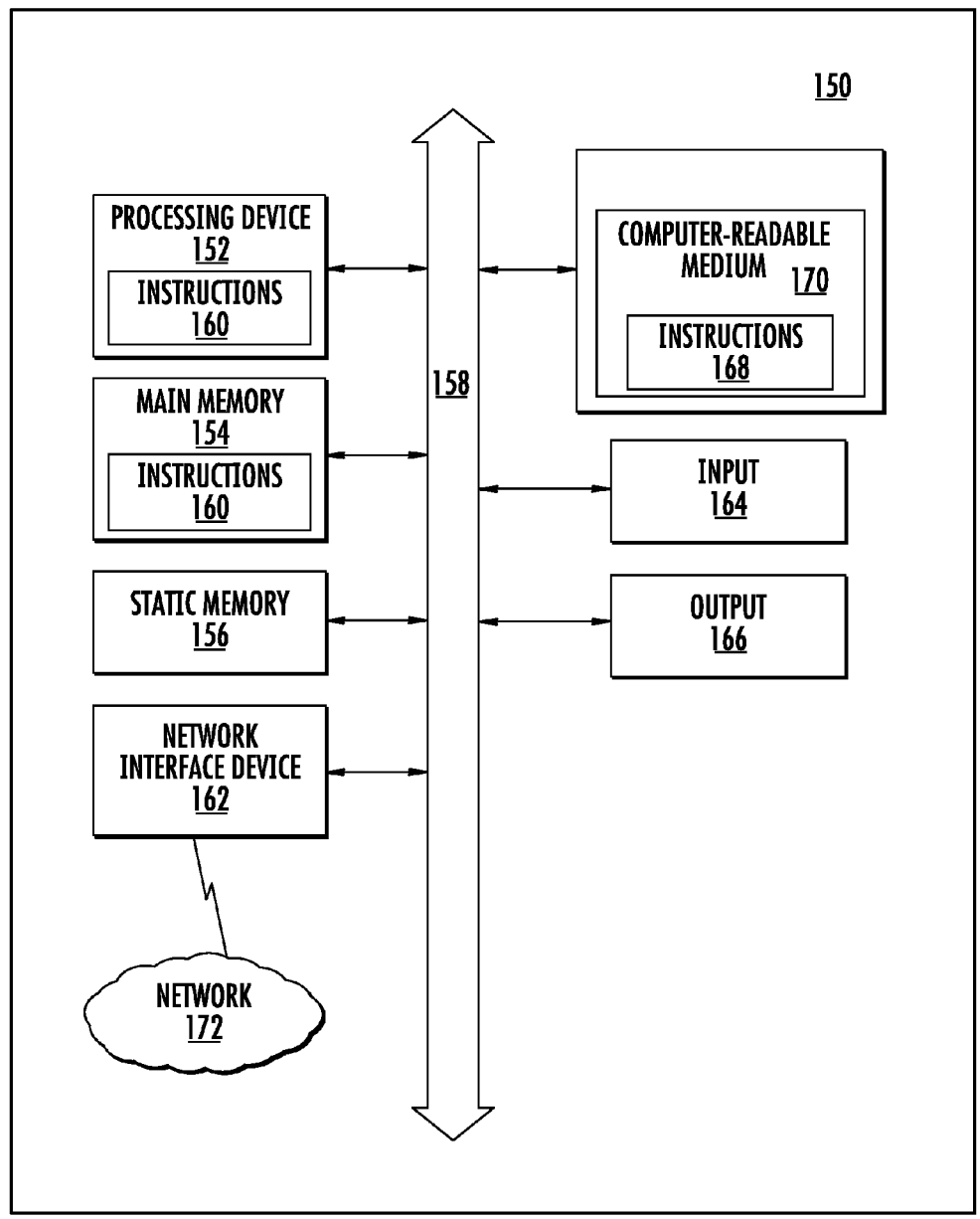
FIG. 10 is a schematic diagram of a generalized representation of a controller.

FIG. 10 is a schematic diagram representation of additional detail illustrating components that could be employed in any of the components or devices disclosed herein or in the MIMO distributed communication systems described herein, if adapted to execute instructions from an exemplary computer-readable medium to perform any of the functions or processing described herein. For example, the processes described in FIGS. 6A and 6B above could be provided as a result of executing instructions from a computer-readable medium. Such component or device may include a computer system 150 within which a set of instructions for performing any one or more of the location services discussed herein may be executed. The computer system 150 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 150 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 150 in this embodiment includes a processing device or processor 152, a main memory 154 (e.g., read-only memory (ROM), flash memory, dynamic random access memory (DRAM), such as synchronous DRAM (SDRAM), etc.), and a static memory 156 (e.g., flash memory, static random access memory (SRAM), etc.), which may communicate with each other via a data bus 158. Alternatively, the processing device 152 may be connected to the main memory 154 and/or static memory 156 directly or via some other connectivity means. The processing device 152 may be a controller, and the main memory 154 or static memory 156 may be any type of memory.

The processing device 152 represents one or more general-purpose processing devices, such as a microprocessor, central processing unit, or the like. More particularly, the processing device 152 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 152 is configured to execute processing logic in instructions 160 for performing the operations and steps discussed herein.

The computer system 150 may further include a network interface device 162. The computer system 150 also may or may not include an input 164, configured to receive input and selections to be communicated to the computer system 150 when executing instructions. The computer system 150 also may or may not include an output 166, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 150 may or may not include a data storage device that includes instructions 168 stored in a computer-readable medium 170. The instructions 168 may also reside, completely or at least partially, within the main memory 154 and/or within the processing device 152 during execution thereof by the computer system 150, the main memory 154 and the processing device 152 also constituting computer-readable medium. The instructions 168 may further be transmitted or received over a network 172 via the network interface device 162.

While the computer-readable medium 170 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); a machine-readable transmission medium (electrical, optical, acoustical, or other form of propagated signals (e.g., carrier waves, infrared signals, digital signals, etc.)); and the like.

Unless specifically stated otherwise and as apparent from the previous discussion, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language.

The logical blocks, modules, circuits, and algorithms described in connection with the embodiments disclosed herein may be implemented as electronic hardware, instructions stored in memory or in another computer-readable medium and executed by a processor or other processing device, or combinations of both. The components of the DASs described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality.

The logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices.

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium. An exemplary storage medium is coupled to the processor such that the processor can read information from, and write information to, the storage medium. In the alternative, the storage medium may be integral to the processor. The processor and the storage medium may reside in an ASIC, which may reside in a remote station. The processor and the storage medium may also reside as discrete components in a remote station, base station, or server.

The operations or steps described may be performed in numerous different sequences other than the illustrated sequences. Furthermore, operations described in a single operational step may be performed in a number of different steps, and one or more operational steps may be combined. Information and signals may be represented using any of a variety of technologies and techniques. For example, data, instructions, commands, information, signals, bits, symbols, and chips, that may be referenced throughout the above description, may be represented by voltages, currents, electromagnetic waves, magnetic fields, or particles, optical fields or particles, or any combination thereof.

As used herein, it is intended that terms "fiber optic cables" and/or "optical fibers" include all types of single mode and multi-mode light waveguides, including one or more optical fibers that may be upcoated, colored, buffered, ribbonized, and/or have other organizing or protective structure in a cable such as one or more tubes, strength members, jackets, or the like.

Many modifications and other embodiments of the embodiments set forth herein will come to mind to one skilled in the art to which the embodiments pertain, and having the benefit of the teachings presented in the forgoing descriptions and the associated drawings. Therefore, it is to be understood that the description and claims are not to be limited to the specific embodiments disclosed, and that modifications and other embodiments are intended to be included within the scope of the appended claims.

What is claimed is:

1. A distributed communications system, comprising:
  a central unit configured to:
    receive downlink communications signals for a multiple-input, multiple-output (MIMO) communications session from a signal source;
    distribute the received downlink communications signals for the MIMO communications session over at least one communications medium to one or more remote units among a plurality of remote units;
    receive uplink communications signals for the MIMO communications session from one or more remote units among the plurality of remote units;
    distribute the received uplink communications signals for the MIMO communications session to the signal source;
  each remote unit among the plurality of remote units comprising:
    a first MIMO antenna;
    a second MIMO antenna;
  each remote unit among the plurality of remote units configured to:
    receive the downlink communications signals for the MIMO communications session over the at least one communications medium from the central unit;
    distribute the received downlink communications signals for the MIMO communications session through the first MIMO antenna and the second MIMO antenna to at least one client device among one or more client devices;
    receive the uplink communications signals for the MIMO communications session from the first MIMO antenna and the second MIMO antenna from at least one client device among the one or more client devices;
    distribute the received uplink communications signals for the MIMO communications session over the at least one communications medium to the central unit;
  one of the central unit and a remote unit among the plurality of remote units is further configured to:
    configure intra-cell antenna bonding for the MIMO communications session for the at least one client device in the remote unit with the first MIMO antenna and the second MIMO antenna in the remote unit in an intra-cell MIMO communications session;
  the remote unit among the plurality of remote units is further configured to:
    receive intra-cell antenna bonded MIMO communications signals from the at least one client device at the first MIMO antenna and the second MIMO antenna in the remote unit in the intra-cell MIMO communications session;
  one of the central unit and a remote unit among the plurality of remote units is further configured to:
    determine if the received intra-cell antenna bonded MIMO communications signals received by the first MIMO antenna and the second MIMO antenna of the remote unit from the at least one client device exceed a threshold MIMO communications signal quality; and
  if the received intra-cell antenna bonded MIMO communications signals received by the first MIMO antenna and the second MIMO antenna of the remote unit from the at least one client device do not exceed the threshold MIMO communications signal quality:
    the remote unit among the plurality of remote units is further configured to:
      receive MIMO communications signals from the at least one client device at an adjacent MIMO antenna of at least one adjacent remote unit to the remote unit;
    one of the central unit and a remote unit among the plurality of remote units is further configured to:
      determine if the received MIMO communications signals received by the adjacent MIMO antenna of the at least one adjacent remote unit from the at least one client device exceed a threshold MIMO communications signal quality; and
      if the received MIMO communications signals received by the adjacent MIMO antenna of the at least one adjacent remote unit from the at least one client device exceed the threshold MIMO communications signal quality, configure inter-cell antenna bonding for inter-cell MIMO communications for the at least one client device in the at least one adjacent remote unit in the distributed communications system such that the at least one client device communicates with the adjacent MIMO antenna in the at least one adjacent remote unit and at least one MIMO antenna among the first MIMO antenna and the second MIMO antenna in the remote unit in an inter-cell MIMO communications session.

2. The distributed communications system of claim 1, wherein:
  the central unit further comprises:
    at least one electro-optical converter configured to convert the received downlink communications signals for the MIMO communications session to received optical downlink communications signals; and
    at least one optical-electro converter configured to convert the received uplink communications signals for the MIMO communications session to received electrical uplink communications signals;
  the central unit is configured to:
    distribute the received optical downlink communications signals for the MIMO communications session over the at least one communications medium to one or more remote units among the plurality of remote units; and distribute the received electrical uplink communications signals for the MIMO communications session to the signal source;

each remote unit among the plurality of remote units comprises:

at least one optical-electro converter configured to convert the received optical downlink communications signals for the MIMO communications session to received electrical downlink communications signals; and at least one electro-optical converter configured to convert the received uplink communications signals for the MIMO communications session from the first MIMO antenna and the second MIMO antenna from at least one client device among the one or more client devices, to received optical uplink communications signals;

each of the plurality of remote units is configured to:

distribute the received optical uplink communications signals for the MIMO communications session over the at least one communications medium to the central unit; and distribute the received electrical downlink communications signals for the MIMO communications session through the first MIMO antenna and the second MIMO antenna to at least one client device among the one or more client devices.

3. The distributed communications system of claim 1, wherein:

the central unit further comprises:

at least one downlink mixer configured to shift a frequency of the received downlink communications signals from an original downlink frequency to a shifted downlink frequency to provide frequency shifted downlink communications signals; and at least one uplink mixer configured to shift a frequency of frequency shifted uplink communications signals from a shifted uplink frequency to an original uplink frequency of the uplink communications signals to provide the uplink communications signals;

the central unit configured to distribute the frequency shifted downlink communications signals for the MIMO communications session over at least one communications medium to one or more remote units among the plurality of remote units; and each of the plurality of remote units further comprises:

at least one downlink mixer configured to shift the frequency of the received frequency shifted downlink communications signals to the original downlink frequency to provide the downlink communications signals; and at least one uplink mixer configured to shift the frequency of the received uplink communications signals to the shifted uplink frequency to provide the frequency shifted uplink communications signals;

each of the plurality of remote units configured to distribute the received shifted uplink communications signals for the MIMO communications session over the at least one communications medium to the central unit.

4. The distributed communications system of claim 1, wherein if the received MIMO communications signals at an adjacent MIMO antenna of the at least one adjacent remote unit from the at least one client device do not exceed the threshold MIMO communications signal quality, one of the central unit and a remote unit among the plurality of remote units is further configured to retain the intra-cell antenna bonding for intra-cell MIMO communications for the at least one client device in the remote unit.

5. The distributed communications system of claim 1, wherein:

the remote unit among the plurality of remote units is further configured to:

receive MIMO communications signals from the at least one client device at the adjacent MIMO antenna of the at least one adjacent remote unit and the at least one MIMO antenna among the first MIMO antenna and the second MIMO antenna in the remote unit;

one of the central unit and a remote unit among the plurality of remote units is further configured to:

determine if the received MIMO communications signals by the adjacent MIMO antenna of the at least one adjacent remote unit from the at least one client device exceed a threshold MIMO communications signal quality; and one of the central unit and a remote unit among the plurality of remote units is further configured to:

if the received MIMO communications signals by the adjacent MIMO antenna of the at least one adjacent remote unit from the at least one client device exceed the threshold MIMO communications signal quality, retain inter-cell antenna bonding for inter-cell MIMO communications for the at least one client device by the adjacent MIMO antenna of the at least one adjacent remote unit and the at least one MIMO antenna among the first MIMO antenna and the second MIMO antenna in the remote unit in the at least one adjacent remote unit.

6. The distributed communications system of claim 1, wherein:

the remote unit among the plurality of remote units is further configured to:

receive MIMO communications signals from the at least one client device at the adjacent MIMO antenna of the at least one adjacent remote unit and the at least one MIMO antenna among the first MIMO antenna and the second MIMO antenna in the remote unit;

one of the central unit and a remote unit among the plurality of remote units is further configured to:

determine if the received MIMO communications signals by the adjacent MIMO antenna of the at least one adjacent remote unit from the at least one client device exceed a threshold MIMO communications signal quality; and one of the central unit and a remote unit among the plurality of remote units is further configured to:

if the received MIMO communications signals by the adjacent MIMO antenna of the at least one adjacent remote unit from the at least one client device do not exceed the threshold MIMO communications signal quality, configure intra-cell antenna bonding for intra-cell MIMO communications for the at least one client device with the first MIMO antenna and the second MIMO antenna in the remote unit.

7. The distributed communications system of claim 1, wherein:

the remote unit among the plurality of remote units is further configured to:

receive MIMO communications signals from the at least one client device at the adjacent MIMO antenna of at least one other adjacent remote unit to the at least one adjacent remote unit;

one of the central unit and a remote unit among the plurality of remote units is further configured to:
determine if the received MIMO communications signals by the adjacent MIMO antenna of the at least one other adjacent remote unit from the at least one client device exceed a threshold MIMO communications signal quality; and one of the central unit and a remote unit among the plurality of remote units is further configured to:
if the received MIMO communications signals by the adjacent MIMO antenna of the at least one other adjacent remote unit from the at least one client device exceed the threshold MIMO communications signal quality, configure inter-cell antenna bonding for MIMO communications for the client device with the at least one other adjacent remote unit in the MIMO distributed communications system such that the client device communicates with the adjacent MIMO antenna of the at least one other adjacent remote unit and at least one adjacent MIMO antenna of the at least one other adjacent remote unit in an inter-cell MIMO communications session.

8. The distributed communications system of claim 1, wherein one of the central unit and a remote unit among the plurality of remote units is further configured to determine if the received intra-cell antenna bonded MIMO communications signals by the first MIMO antenna and the second MIMO antenna of the remote unit from the at least one client device exceed a threshold MIMO communications signal strength.

9. The distributed communications system of claim 1, wherein one of the central unit and a remote unit among the plurality of remote units is further configured to determine if the received MIMO communications signals at the at least one adjacent remote unit from the at least one client device exceed a threshold MIMO communications signal strength.

10. The distributed communications system of claim 1, wherein one of the central unit and a remote unit among the plurality of remote units is configured to store the intra-cell antenna bonding for the intra-cell MIMO communications for the at least one client device at the remote unit in a dynamic cell antenna bonding table.

11. The distributed communications system of claim 1, wherein the one of the central unit and a remote unit among the plurality of remote units is configured to store the inter-cell antenna bonding for the inter-cell MIMO communications for the at least one client device at the at least one adjacent remote unit in a dynamic cell antenna bonding table, if the received MIMO communications signals by the adjacent MIMO antenna of the at least one adjacent remote unit from the at least one client device exceed the threshold MIMO communications signal quality.

12. The distributed communications system of claim 1, wherein the one of the central unit and a remote unit among the plurality of remote units is further configured to identify the at least one adjacent remote unit to the remote unit from a remote unit mapping table.

13. The distributed communications system of claim 1, wherein the one of the central unit and a remote unit among the plurality of remote units comprises the central unit.

14. The distributed communications system of claim 1, wherein the one of the central unit and a remote unit among the plurality of remote units comprises the remote unit.

15. A distributed communications system, comprising:
a central unit configured to:
receive downlink communications signals for a multiple-input, multiple-output (MIMO) communications session from a signal source;
distribute the received downlink communications signals for the MIMO communications session over at least one communications medium to one or more remote units among a plurality of remote units;
receive uplink communications signals for the MIMO communications session from one or more remote units among the plurality of remote units;
distribute the received uplink communications signals for the MIMO communications session to the signal source;

each remote unit among the plurality of remote units comprising:
a first MIMO antenna;
a second MIMO antenna;

each remote unit among the plurality of remote units configured to:
receive the downlink communications signals for the MIMO communications session over the at least one communications medium from the central unit;
distribute the received downlink communications signals for the MIMO communications session through the first MIMO antenna and the second MIMO antenna to at least one client device among one or more client devices;
receive the uplink communications signals for the MIMO communications session from the first MIMO antenna and the second MIMO antenna from at least one client device among the one or more client devices;
distribute the received uplink communications signals for the MIMO communications session over the at least one communications medium to the central unit;

the central unit further configured to:
configure intra-cell antenna bonding for the MIMO communications session for the at least one client device in a remote unit among the plurality of remote units with the first MIMO antenna and the second MIMO antenna in the remote unit in an intra-cell MIMO communications session;

the remote unit among the plurality of remote units further configured to:
receive intra-cell antenna bonded MIMO communications signals from the at least one client device at the first MIMO antenna and the second MIMO antenna in the remote unit in the intra-cell MIMO communications session;

the central unit further configured to:
determine if the received intra-cell antenna bonded MIMO communications signals received by the first MIMO antenna and the second MIMO antenna of the remote unit from the at least one client device exceed a threshold MIMO communications signal quality; and if the received intra-cell antenna bonded MIMO communications signals received by the first MIMO antenna and the second MIMO antenna of the remote unit from the at least one client device do not exceed the threshold MIMO communications signal quality:
the remote unit among the plurality of remote units further configured to:

receive MIMO communications signals from the at least one client device at an adjacent MIMO antenna of at least one adjacent remote unit to the remote unit;

the central unit further configured to:
  determine if the received MIMO communications signals received by the adjacent MIMO antenna of the at least one adjacent remote unit from the at least one client device exceed a threshold MIMO communications signal quality; and
  if the received MIMO communications signals received by the adjacent MIMO antenna of the at least one adjacent remote unit from the at least one client device exceed the threshold MIMO communications signal quality, configure inter-cell antenna bonding for inter-cell MIMO communications for the at least one client device in the at least one adjacent remote unit in the distributed communications system such that the at least one client devices communicates with the adjacent MIMO antenna in the at least one adjacent remote unit and at least one MIMO antenna among the first MIMO antenna and the second MIMO antenna in the remote unit in an inter-cell MIMO communications session.

16. A distributed communications system, comprising:
a central unit configured to:
  receive downlink communications signals for a multiple-input, multiple-output (MIMO) communications session from a signal source;
  distribute the received downlink communications signals for the MIMO communications session over at least one communications medium to one or more remote units among a plurality of remote units;
  receive uplink communications signals for the MIMO communications session from one or more remote units among the plurality of remote units;
  distribute the received uplink communications signals for the MIMO communications session to the signal source;
each remote unit among the plurality of remote units comprising:
  a first MIMO antenna;
  a second MIMO antenna;
each remote unit among the plurality of remote units configured to:
  receive the downlink communications signals for the MIMO communications session over the at least one communications medium from the central unit;
  distribute the received downlink communications signals for the MIMO communications session through the first MIMO antenna and the second MIMO antenna to at least one client device among one or more client devices;
  receive the uplink communications signals for the MIMO communications session from the first MIMO antenna and the second MIMO antenna from at least one client device among the one or more client devices;
  distribute the received uplink communications signals for the MIMO communications session over the at least one communications medium to the central unit;

the central unit further configured to:
  configure intra-cell antenna bonding for the MIMO communications session for the at least one client device in a remote unit among the plurality of remote units with the first MIMO antenna and the second MIMO antenna in the remote unit in an intra-cell MIMO communications session; and the remote unit among the plurality of remote units further configured to:
  receive intra-cell antenna bonded MIMO communications signals from the at least one client device at the first MIMO antenna and the second MIMO antenna in the remote unit in the intra-cell MIMO communications session; and
  determine if the received intra-cell antenna bonded MIMO communications signals received by the first MIMO antenna and the second MIMO antenna of the remote unit from the at least one client device exceed a threshold MIMO communications signal quality; and if the received intra-cell antenna bonded MIMO communications signals received by the first MIMO antenna and the second MIMO antenna of the remote unit from the at least one client device do not exceed the threshold MIMO communications signal quality:
  the remote unit among the plurality of remote units further configured to:
    receive MIMO communications signals from the at least one client device at an adjacent MIMO antenna of at least one adjacent remote unit to the remote unit; and
    determine if the received MIMO communications signals received by the adjacent MIMO antenna of the at least one adjacent remote unit from the at least one client device exceed a threshold MIMO communications signal quality; and
  the central unit further configured to:
    if the received MIMO communications signals received by the adjacent MIMO antenna of the at least one adjacent remote unit from the at least one client device exceed the threshold MIMO communications signal quality, configure inter-cell antenna bonding for inter-cell MIMO communications for the at least one client device in the at least one adjacent remote unit in the distributed communications system such that the at least one client device communicates with the adjacent MIMO antenna in the at least one adjacent remote unit and at least one MIMO antenna among the first MIMO antenna and the second MIMO antenna in the remote unit in an inter-cell MIMO communications session.

* * * * *